US011926022B2

(12) United States Patent
Abel, Jr.

(10) Patent No.: US 11,926,022 B2
(45) Date of Patent: Mar. 12, 2024

(54) SCREWING TOOL FOR TRANSMITTING TWO SET TORQUES

(71) Applicant: Wera Werkzeuge GmbH, Wuppertal (DE)

(72) Inventor: Michael Abel, Jr., Radevormwald (DE)

(73) Assignee: Wera Werkzeuge GmbH, Wuppertal (DE)

( * ) Notice: Subject to any disclaimer, the term of this patent is extended or adjusted under 35 U.S.C. 154(b) by 160 days.

(21) Appl. No.: 17/051,500

(22) PCT Filed: May 9, 2019

(86) PCT No.: PCT/EP2019/061951
§ 371 (c)(1),
(2) Date: Oct. 29, 2020

(87) PCT Pub. No.: WO2011/219505
PCT Pub. Date: Nov. 21, 2019

(65) Prior Publication Data

US 2021/0308843 A1 Oct. 7, 2021

(30) Foreign Application Priority Data

May 18, 2018 (DE) ..................... 10 2018 112 068.0

(51) Int. Cl.
*B25B 23/142* (2006.01)
*B25B 15/02* (2006.01)

(52) U.S. Cl.
CPC .......... *B25B 23/1427* (2013.01); *B25B 15/02* (2013.01)

(58) Field of Classification Search
CPC . B25B 15/02; B25B 23/1427; B25B 23/1422; B25B 23/142
USPC ........ 81/475, 474, 124.4, 57.36, 57.22, 473, 81/476, 470, 481, 482, 483
See application file for complete search history.

(56) References Cited

U.S. PATENT DOCUMENTS

| | | | | |
|---|---|---|---|---|
| 2,835,365 | A * | 5/1958 | Henry | F16D 43/2024 81/475 |
| 5,481,948 | A * | 1/1996 | Zerkovitz | B25B 15/008 81/436 |
| 5,538,089 | A | 7/1996 | Sanford | |
| 5,782,146 | A * | 7/1998 | Lin | B25B 15/04 81/177.4 |
| 6,253,645 | B1 | 7/2001 | Lin | |
| 2002/0102143 | A1 | 8/2002 | Huang | |
| 2007/0137443 | A1* | 6/2007 | Blizniuk | B25B 23/0035 81/177.2 |

(Continued)

FOREIGN PATENT DOCUMENTS

| | | |
|---|---|---|
| DE | 10341697 B3 | 10/2004 |
| DE | 102004061482 A1 | 6/2006 |

(Continued)

OTHER PUBLICATIONS

Written Opinion of the International Searching Authority and International Search Report; International Application No. PCT/EP2019/061951; dated Aug. 27, 2019; 7 pages.

*Primary Examiner* — Brian D Keller
*Assistant Examiner* — Robert C Moore
(74) *Attorney, Agent, or Firm* — Whitmyer IP Group LLC

(57) ABSTRACT

The invention relates to a screwing tool for transmitting a set torque. Two torque-limiting arrangements (5, 7) are provided that are biased by the same spring element (9).

16 Claims, 7 Drawing Sheets

(56) References Cited

U.S. PATENT DOCUMENTS

| | | | | |
|---|---|---|---|---|
| 2013/0226192 | A1 | 8/2013 | Nino et al. | |
| 2015/0059539 | A1* | 3/2015 | Hsieh | B25B 23/1427 81/467 |

FOREIGN PATENT DOCUMENTS

| | | | | |
|---|---|---|---|---|
| DE | 202015100708 | U1 | 6/2016 | |
| DE | 102015205623 | A1 * | 9/2016 | B25B 15/02 |
| EP | 2594367 | A1 | 5/2013 | |

* cited by examiner

SCREWING TOOL FOR TRANSMITTING TWO SET TORQUES

FIELD OF THE ART

The invention relates to a screwing tool for transmitting a torque with a spring element that biases a first torque-limiting arrangement and a second torque-limiting arrangement.

PRIOR ART

DE 103 41 697 B3 discloses a screwing tool with two torque-limiting arrangements arranged in a housing and which are biased by a common compression spring. The two torque-limiting arrangements increase the stroke of the compression spring required to overcome the limit torque.

EP 2 594 367 A1 describes a similar screwing tool. Here, two torque-limiting devices are also provided.

U.S. Pat. No. 5,538,089 describes a coupling with three coupling elements, each comprising interlocking coupling cams that can slide against one another on sloping surfaces.

Another screwing tool is known from DE 10 2004 061 482 A1. In the previously known screwing tool, a shaft is located in a cavity of a handle, which shaft comprises a support member at its rear end, on which a spring element is supported, which exerts force onto a first torque-limiting element, which is arranged in the housing in a torque-proof but axially movable manner. The first torque-limiting element has sloping flanks, which abut the opposing sloping flanks of a second torque-limiting element, which is axially arranged on the housing in a firm manner but can twist against the housing. This second torque-limiting element is connected to a torque output tool. The force of the spring and the gradient angle of the sloping flanks define the breakaway torque of the torque-limiting arrangement.

From DE 20 2015 100 708 U1, a micro-tool is known, which comprises a torque-limiting device.

SUMMARY OF THE INVENTION

The invention is based on the object of further developing a generic screwing tool that is more advantageous for use and, in particular, in such a way that it can be implemented as a micro-tool.

The task is achieved by means of the invention specified in the claims. The subclaims do not only represent favorable further embodiments of the main claim. They are also independent solutions to the task.

According to the invention, the spring element should be supported on a support member, which is formed out of a second torque-limiting arrangement. Thereby, according to the invention, a single spring element with the same spring force biases two different torque-limiting arrangements, wherein each torque-limiting arrangement preferably comprises two torque-limiting elements respectively. The spring, which is preferably formed out of a helical compression spring, but can also be a leaf spring, a conical spring, a disk spring or a plastic body, thereby biases two pairs of torque-limiting elements, which preferably have the sloping flanks of one resting upon the other respectively. Each torque-limiting arrangement can therefore comprise a first torque-limiting element comprising sloping flanks that abut sloping flanks assigned to a second torque-limiting element. The torque-limiting arrangements can comprise sloping flanks with different gradient angles. Since the gradient angle defines the height of the breaking torque, i.e. the limit torque, the torque-limiting device according to the invention can provide two, in particular, set torques. In a preferred further embodiment of the invention, the torque-limiting elements are designed as sleeves. These sleeves can be arranged on an axis. The pairs of torque-limiting elements each have an axially movable torque-limiting element, which is connected to the housing in a torque-proof manner. The two ends of the spring element mutually pointing away from one another preferably engage these axially movable torque-limiting elements. The axially movable torque-limiting elements interact with two axially fixed torque-limiting elements, which are, however, axially movable with respect to the housing, which torque-limiting elements can be firmly connected to a blade or each comprise a blade receptacle for inserting a blade. The two blades preferably lie on a common axis so that two blade receptacles can comprise openings pointing in the opposing direction, into which a blade can be respectively inserted. The tool can be designed as a micro-tool. For this purpose, it is advantageous if the housing is formed out of a flat body. In particular, it can consist of two interconnected housing shells, wherein the housing shells can be clipped, bonded or welded together. The sloping flanks are preferably formed out of a saw-toothing, wherein each tooth forms a sloping flank and a steep flank, with which high torques, for loosening a screw for example, can be applied. Both torque-limiting arrangements preferably act in the same direction, for example clockwise.

BRIEF DESCRIPTION OF THE DRAWINGS

An exemplary embodiment of the invention is explained below based on the drawings. The figures show.

DESCRIPTION OF THE EMBODIMENTS

Figure 1:
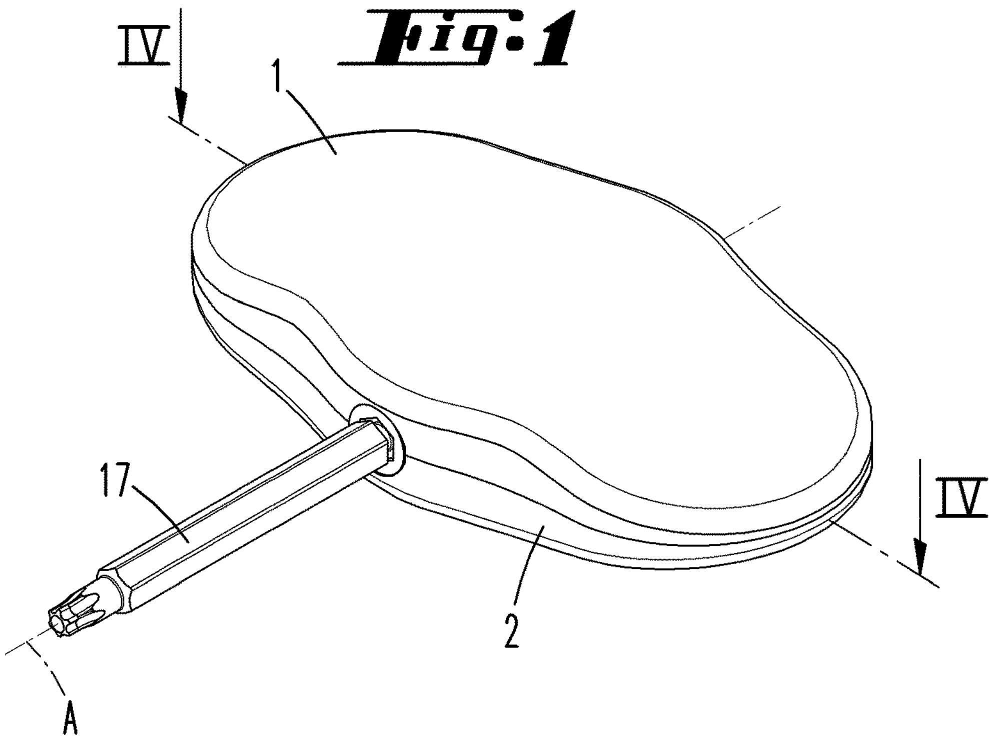
FIG. 1 a perspective representation of a screwing tool.
Figure 2:
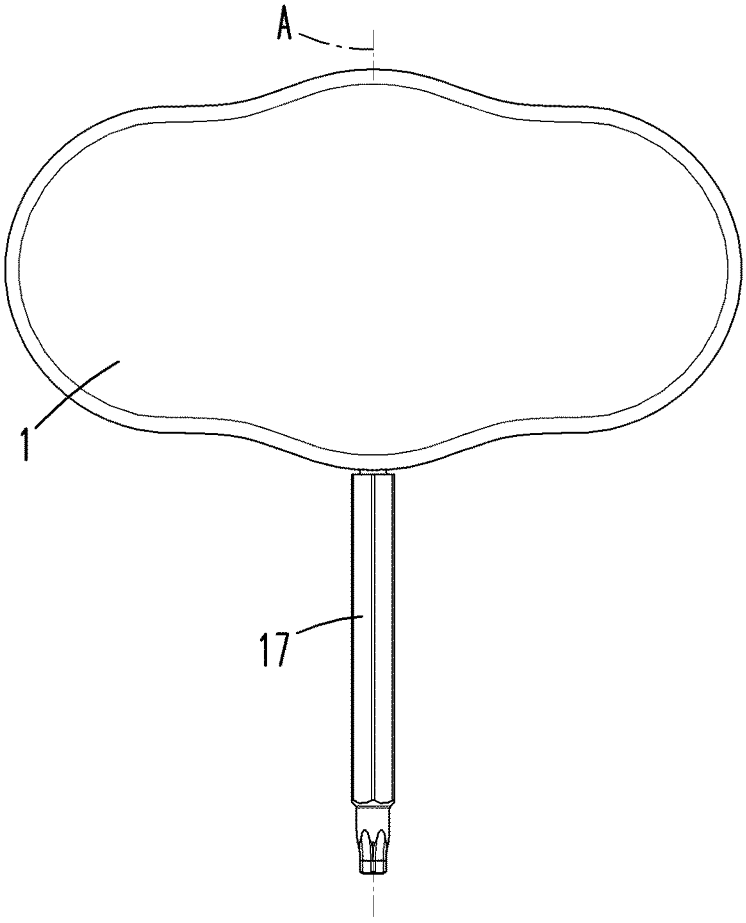
FIG. 2 a lateral view of the screwing tool.
Figure 3:
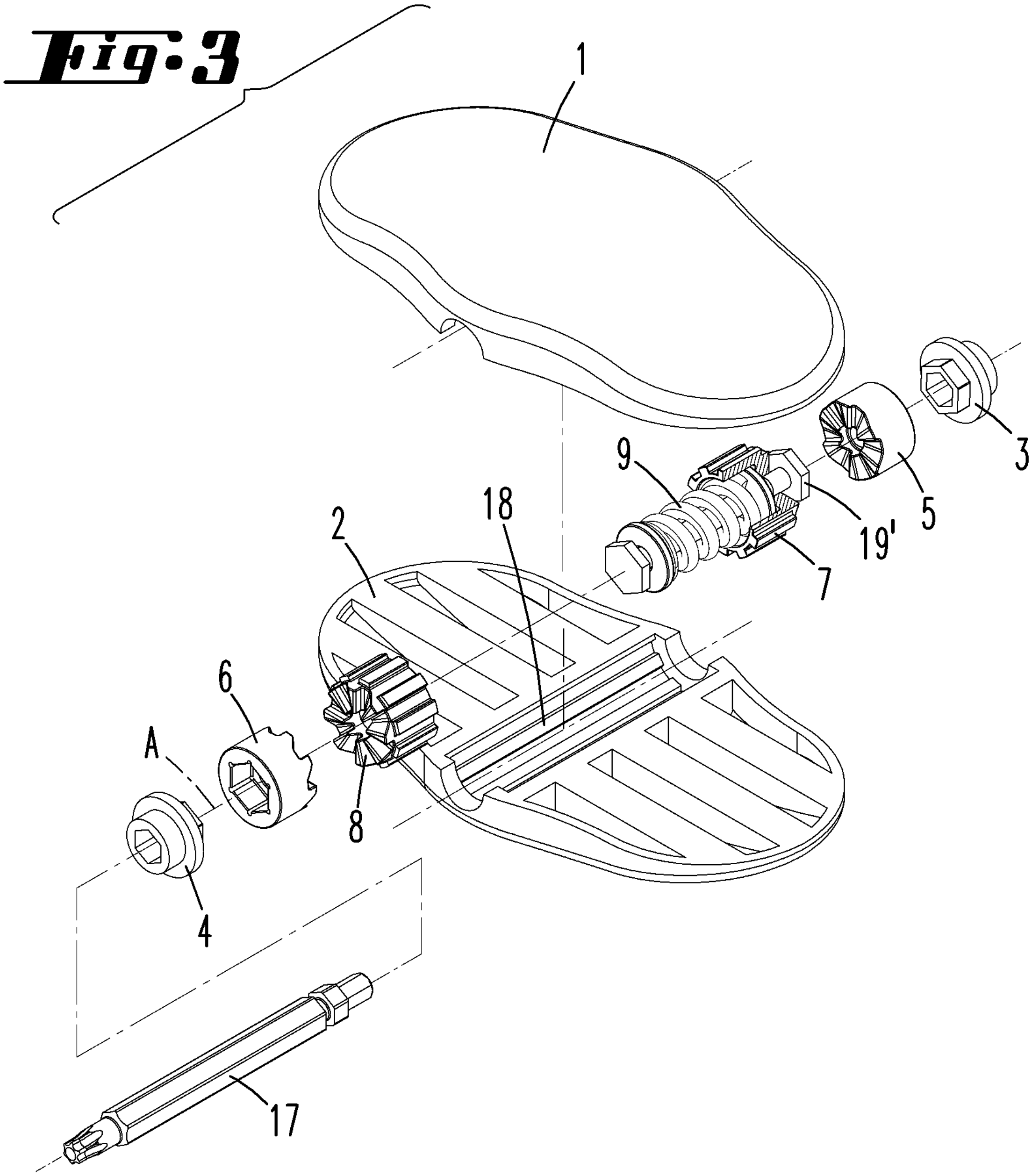
FIG. 3 a first exploded representation of the screwing tool.
Figure 4:
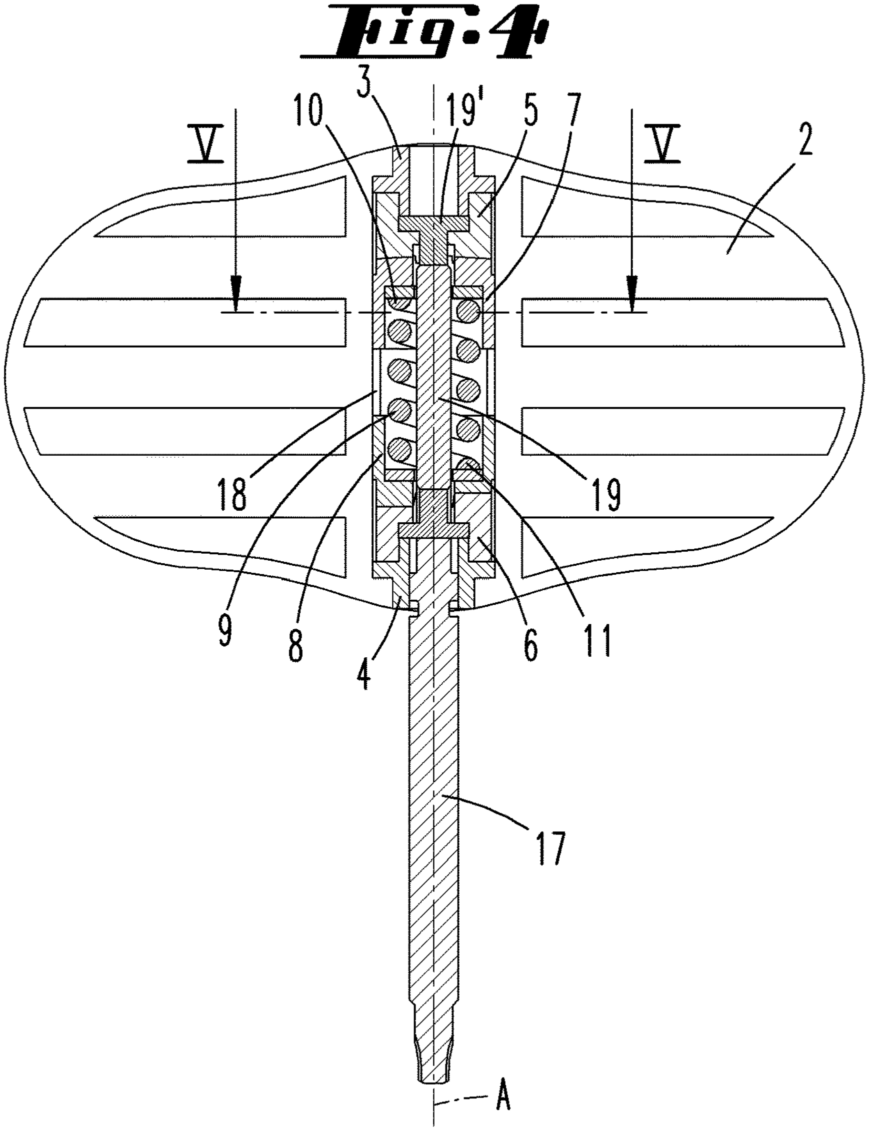
FIG. 4 a cross-sectional view through the handle housing of the screwing tool along the section line IV-IV in FIG. 1, FIG. 5 increases the sectional view in accordance with line V-V in FIG. 4, FIG. 6 an illustration in accordance with FIG. 1, wherein another blade is inserted into a rear blade receptacle, FIG. 7 an illustration in accordance with FIG. 2 in the operating position shown in FIG. 6, FIG. 8 a second exploded illustration of the screwing tool, wherein, here, an axle 19 is missing, FIG. 9 a representation according to FIG. 4 with distant axle 19, and FIG. 10 the sectional view in accordance with line X-X in FIG. 9.
Figure 5:
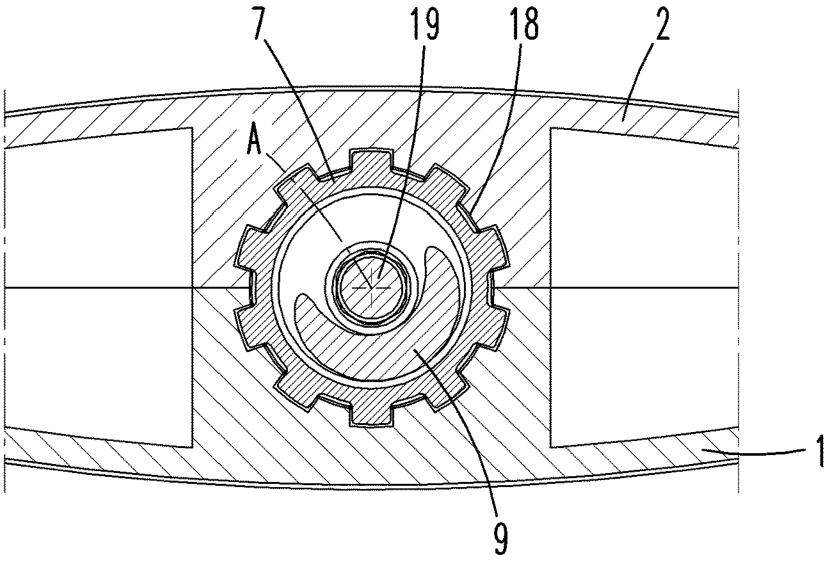
Figure 6:
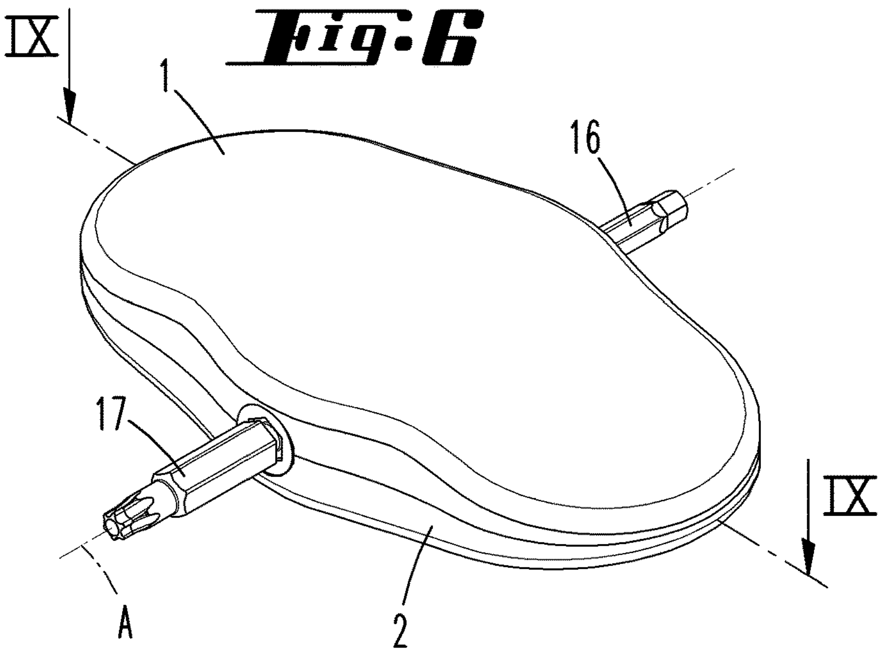
Figure 7:
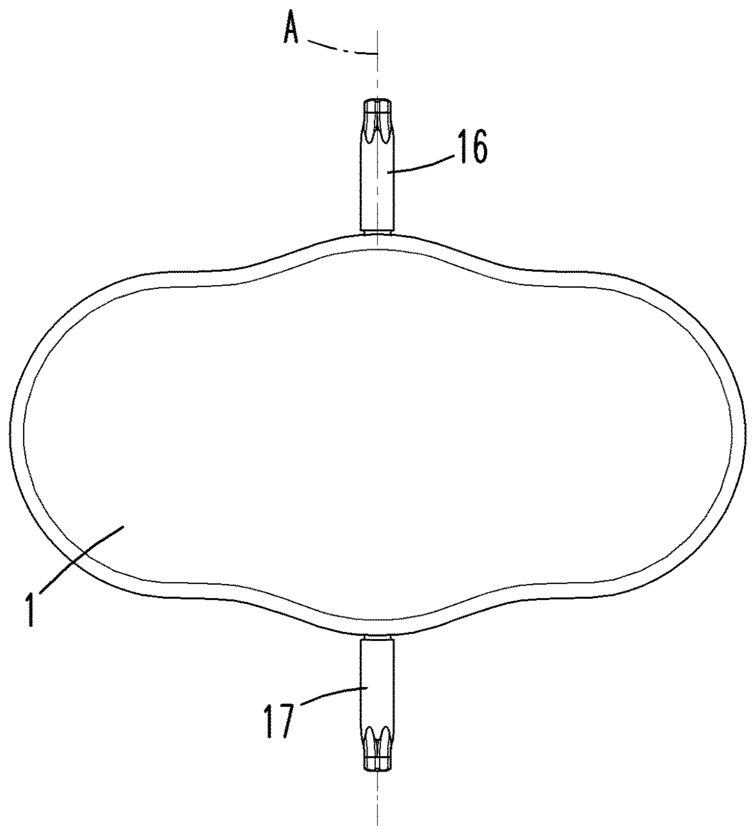
Figure 8:
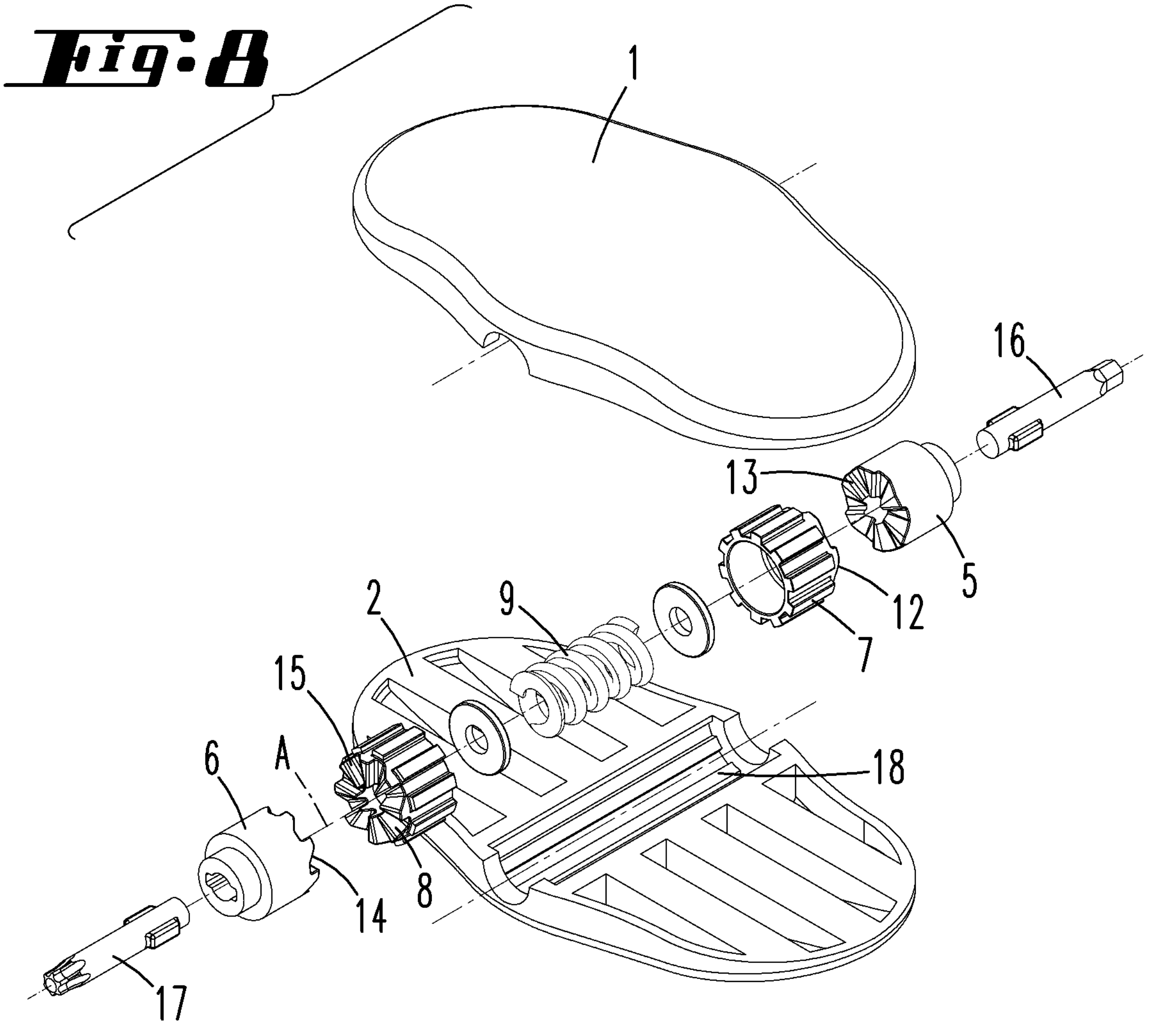
Figure 9:
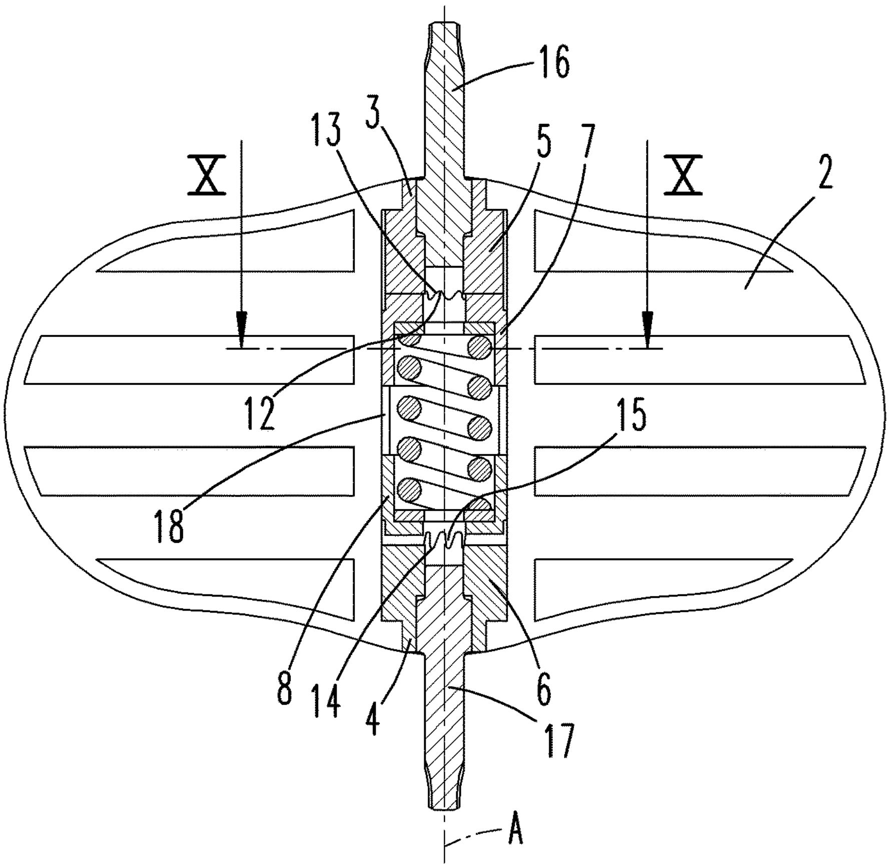
Figure 10:
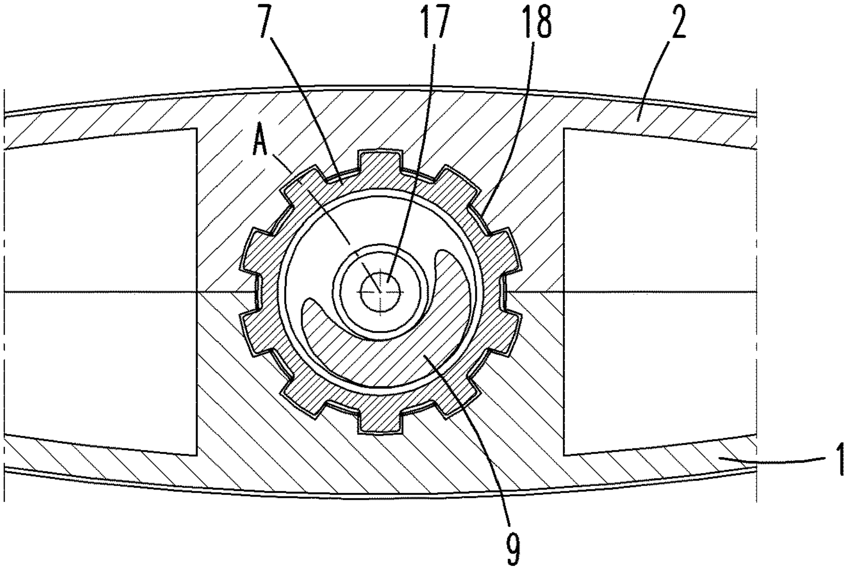

The screwing tool shown in the drawings is a flat tool for transmitting two different torques. For this purpose, the screwing tool has a flat housing, which is formed out of housing shells 1, 2. The outer surface of the housing forms torque transmission surfaces, on which a torque can be applied by means of the fingers of a user's hand. The torque is applied to one of two blades 16, 17 lying in a common axis A, wherein one blade 16, 17 has been respectively inserted into a blade receptacle 3, 4 of the housing. The two blade receptacles 3, 4 point in opposing directions.

Inside the housing is a torque-limiting device, there is a torque-limiting device in the form of a double sloping flank transmission. The torque-limiting device has two torque-limiting arrangements, which are arranged in a mirror-inverted manner. Each torque-limiting arrangement has two torque-limiting elements 5, 6 and 7, 8, which have the sloping flanks of one resting upon the other respectively. The sloping flanks 12, 13 and 14, 15 of the two sloping flank arrangements have teeth with tooth flanks, which are at different gradient angles away from one another. The tooth flanks are the flanks of saw teeth.

The two blade receptacles 3, 4 are each assigned to a torque-limiting element 5, 6, which can be rotated with respect to the housing 1, 2. The two torque-limiting elements 5, 6 are firmly assigned to the housing in an axial manner.

These torque-limiting elements 5, 6 have sloping flanks 13, 14. The sloping flanks 14, 15 have a greater gradient than the sloping flanks 12, 13 so that a greater torque can be transmitted onto the blade 17 that is assigned to the torque-limiting element 6 with the sloping flanks 14 having a greater gradient, than onto the torque-limiting element 5, the sloping flanks 13 of which have a greater gradient.

The sloping flanks 12, 13 and 14, 15 are formed out of sawtooth-like projections, which interlock and can respectively transmit a greater torque in the counter-clockwise direction than in the clockwise direction.

The torque-limiting elements 5, 6, which can be rotated with respect to the housing, interact with torque-limiting elements 7, 8 connected to the housing in a torque-proof manner, which form the sloping flanks 12 and 15, which abut the sloping flanks 13 and 14 respectively. These torque-limiting elements 7, 8 are movably arranged with respect to the housing 1, 2 in the extension direction of the two blades 16, 17. Ribs 18 are provided, which project radially inwards from a housing cavity and which engage into tooth recesses of the axially movable torque-limiting elements 7, 8 to bind them to the housing 1, 2 in a torque-proof manner.

A pre-loaded helical compression spring 9 is provided, which is supported on support surfaces of the axially movable torque-limiting elements 7, 8. A first end 10 of the helical compression spring 9 is supported on the base of a pot-shaped recess of the torque-limiting element 7. An end 11 lying opposite to this end 10 of the helical compression spring 9 is supported on the base of a pot-shaped recess of the torque-limiting element 8.

The four torque-limiting elements 5, 6, 7, 8 lie successively in the axis direction, one after the another. An axle body 19 can extend between the blade receptacles 3, 4, which passes centrally through the helical compression spring 9 and the two axially movable torque-limiting elements 7, 8 designed as sleeves. In the exemplary embodiment in FIGS. 1 to 5, the two-part axle element 19, 19' extends from a blade receptacle 3 to the opposite blade receptacle 4. The two axle bodies 19, 19' have heads with an enlarged diameter, which form the base of the blade receptacles 3, 4. In the exemplary embodiment shown in FIGS. 6 to 10, this two-part axle element 19, 19' is not present.

Figure 11:
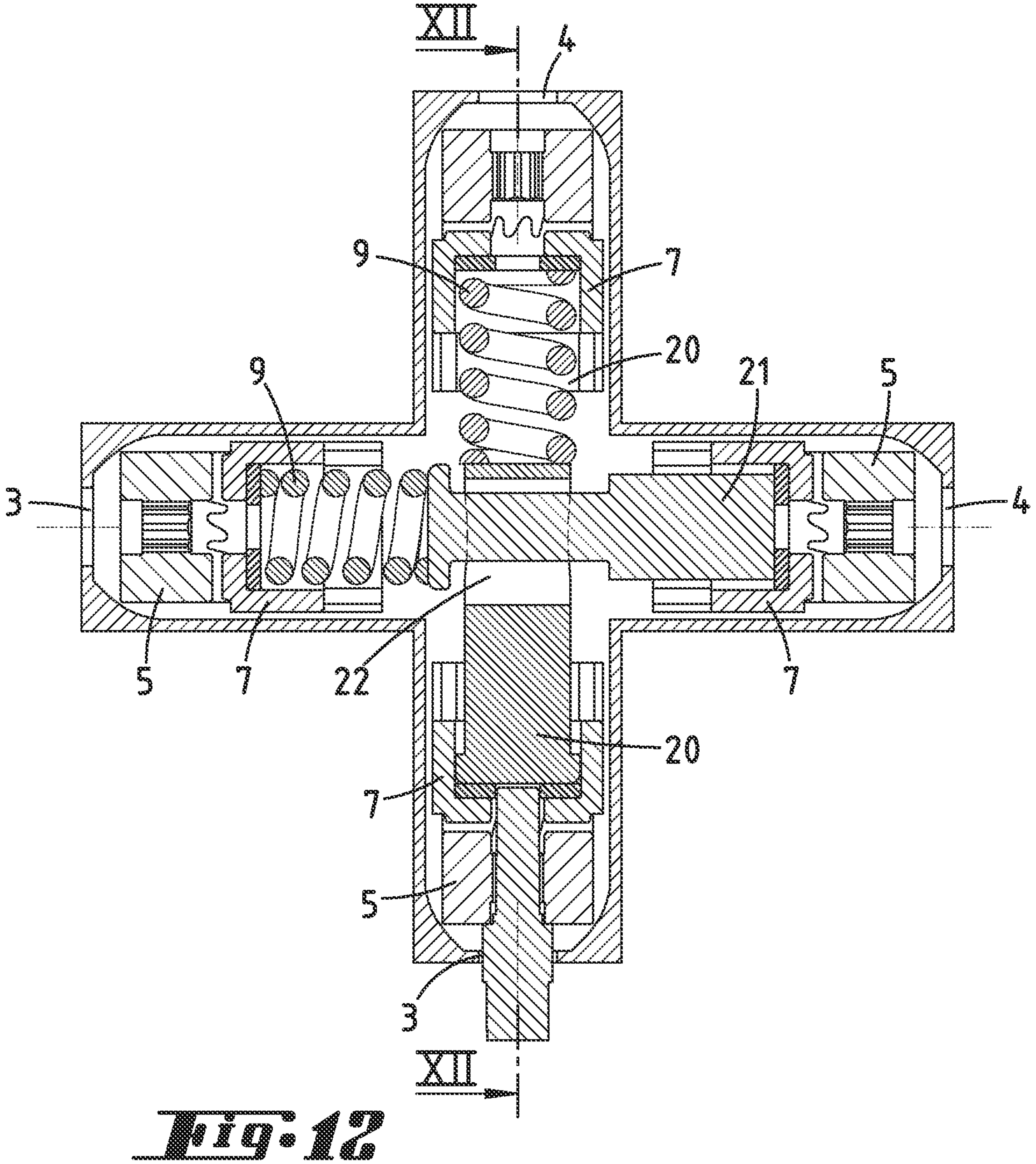
FIG. 11 a cross-sectional view through the handle housing of the screwing tool.
Figure 12:
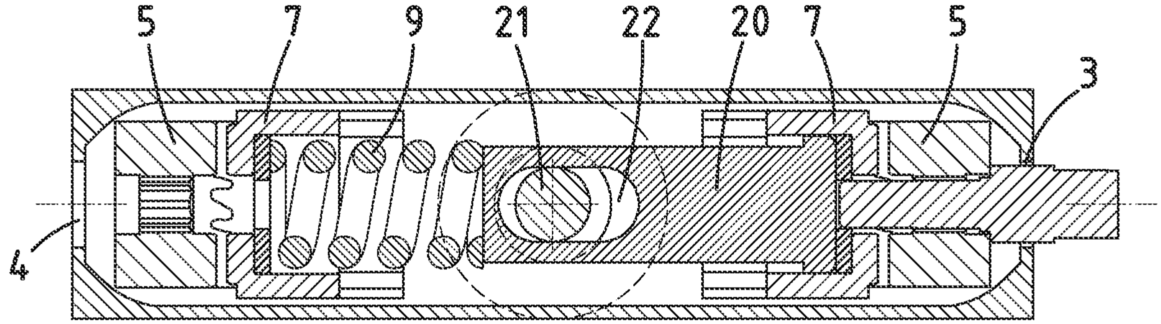
FIG. 12 a cross-sectional view through the handle housing of the screwing tool.

In other exemplary embodiments, it can be provided that the tool forms more than two blade receptacles 3, 4 and more than one spring element 9. However, it can also be provided that two axes, each with two screwing tools 16, 17, intersect. A spring element formed, for example, by a leaf spring element or an elastic body, can be a common spring element here, which not only biases two torque-limiting arrangements, but a plurality of them, for example, four torque-limiting arrangements. FIGS. 11 and 12 show an embodiment, wherein it is provided that s spring 9 under the intermediate connection of one or a plurality of tappets 20, 21 is supported with its two ends on a torque-limiting arrangement respectively. In this embodiment, it is furthermore provided that such a tappet 20 has an oblong hole 22, through which another tappet 21 transversely protrudes. Both tappets 20, 21 can move relative to one another. This tappet can also be biased by one end of a compression spring 9. The tappet 20, 21 and the other end of the compression spring then each have a torque-limiting arrangement. In this or another variant, four torque-limiting arrangements are provided, which have four different limiting torques, but which are biased by only two compression springs 9. The different limit torques are determined by the gradient of the sloping flanks. Another variant can provide that two screwing tools, as shown in the drawings, are connected to one another. In particular, they are rotatably connected to one another. Two such screwing tools can be connected to one another under the formation of a rotational axis extending across the broad sides. The housings can be formed in this variant in a space-saving manner as slender pipes, which can be pivoted around a rotational axis from a parallel position into an intersecting position so that the tool in the pivoted state has a spider-wrench-like appearance. Such an appearance can also be achieved with a tappet arrangement, in which a tappet with a small diameter protrudes an oblong hole of a tappet with a large diameter and each tappet is biased by a spring element so that the tappet can be shifted relative to one another in one direction transversely to the other tappet.

The aforementioned embodiments serve to explain the inventions covered by the application as a whole, which also independently further develop the prior art at least by means of the following combinations of features, wherein two, a plurality or all of these combinations of features can also be combined, namely:

A screwing tool characterized in that the spring element 9 biases a second torque-limiting arrangement 6, 8.

A screwing tool characterized in that the first and/or second torque-limiting arrangement comprises two torque-limiting elements 5, 6; 7, 8 that have the sloping flanks of one resting upon the other respectively 12, 13; 14, 15.

A screwing tool characterized in that the first sloping flanks 12, 13 of the first torque-limiting arrangement 5, 7 comprise a different gradient angle than the second sloping flanks 14, 15 of the second torque-limiting arrangement 6, 8.

A screwing tool characterized in that each of the two torque-limiting arrangements 5, 7; 6, 8 each comprise a pair of torque-limiting elements 5, 6; 7, 8.

A screwing tool characterized in that the torque-limiting elements 5, 6; 7, 8 have a sleeve shape, wherein the end faces of the sleeves comprise the toothing 12, 13; 14, 15.

A screwing tool characterized by diametrically opposite blade receptacles 3, 4 or blades 16, 17.

A screwing tool characterized in that the torque-limiting device comprising at least two torque-limiting arrangements 5, 6; 7, 8 is arranged in a flat housing, wherein the housing consists, in particular, of two housing shells 1, 2.

A screwing tool that is characterized in that the spring element 9 exerting force on at least two torque-limiting arrangements 5, 7; 6, 8 is a helical compression spring.

A screwing tool, which is characterized in that at least one first end 10 of the spring element 9 and at least another, in particular, second end 11 of the same spring element 9 is supported on one axially movable torque-limiting element 7, 8 respectively, which is connected to the housing in a torque-proof manner, which is operatively connected in a torque-transmitting manner to a second torque-limiting element 5, 6 respectively, which can be rotated with respect to the housing 1, 2.

All disclosed features are essential for the invention (in themselves, but also in combination with each other). In the disclosure of the application, the disclosure contents of the related/enclosed priority documents (copy of the pre-application) shall hereby be fully included, and also concerning this purpose, features of these documents must be included in claims of the present application. The subclaims characterize, even without the features of a referenced claim, with their features, independent inventive further embodiments of prior art, in particular, in order to carry out divisional applications on the basis of these claims. The invention specified in each claim can additionally have one or a plurality of the features specified in the above description, in particular, being provided with reference numbers and/or specified in the reference number list. The invention also relates to embodiments, in which some of the features mentioned in the above description are not implemented, in particular, insofar as they are recognizable for the respective purpose of use expendable or can be replaced by other technically identical means.

LIST OF REFERENCE NUMBERS

1 housing shell
A axis
2 housing shell
3 blade receptacle
4 blade receptacle
torque-limiting element
6 torque-limiting element
7 torque-limiting element
8 torque-limiting element
9 spring element
first end
11 second end
12 sloping flank, toothing
13 sloping flank, toothing
14 sloping flank, toothing
sloping flank, toothing
16 blade
17 blade
18 rib
19 axle element
19' axle element

The invention claimed is:

1. A screwing tool for transmitting a torque with a spring element, which biases a first torque-limiting arrangement and a second torque-limiting arrangement, wherein the first torque-limiting arrangement limits a torque applied to a first blade receptacle or a first blade with a first limit torque, and wherein the second torque-limiting arrangement limits a torque applied to a second blade receptacle or a second blade with a second limit torque, which is greater than the first limit torque, wherein the first limit torque of the first torque-limiting arrangement and the second limit torque of the second torque-limiting arrangement are applied in the same rotational direction.

2. The screwing tool according to claim 1, wherein the first torque-limiting arrangement comprises two torque-limiting elements that have first sloping flanks of one resting upon the other, and wherein the second torque-limiting arrangement comprises two torque-limiting elements that have second sloping flanks of one resting upon the other; and wherein the first and second sloping flanks are formed out of sawtooth projections, which interlock and respectively transmit a greater torque in a counter clockwise direction than in a clockwise direction.

3. The screwing tool according to claim 2, wherein the first sloping flanks of the first torque-limiting arrangement comprise a different gradient angle than the second sloping flanks of the second torque-limiting arrangement.

4. The screwing tool according to claim 2, wherein the torque-limiting elements have a sleeve shape, wherein the end faces of the sleeves comprise a toothing.

5. The screwing tool according to claim 2, wherein the blade receptacles or the blades are located diametrically opposite to each other.

6. The screwing tool according to claim 2, wherein the first and second two torque-limiting arrangements are arranged in a flat housing, wherein the housing consists of two housing shells.

7. The screwing tool according to claim 2, wherein the spring element exerting force onto the first and second torque-limiting arrangements is a helical compression spring.

8. The screwing tool according to claim 3, wherein the first sloping flanks differ from the second sloping flanks with respect to an axial height such that the spring element is configured to be compressed with different amounts depending on which one of the first and second torque-limiting arrangements is applied.

9. The screwing tool according to claim 1, wherein each of the torque-limiting arrangements comprise a first torque-limiting element and a second torque-limiting element.

10. The screwing tool according to claim 9, wherein the first torque-limiting elements and the second torque-limiting elements each have a sleeve shape, wherein the end faces of the sleeves comprise a toothing.

11. The screwing tool according to claim 1, wherein the blade receptacles or the blades are located diametrically opposite to each other.

12. The screwing tool according to claim 1, wherein the first and second torque-limiting arrangements are arranged in a flat housing, wherein the housing consists of two housing shells.

13. The screwing tool according to claim 1, wherein the spring element exerting force onto the first and second torque-limiting arrangements is a helical compression spring.

14. The screwing tool according to claim 9, wherein at least one first end of the spring element and at least one second end of the same spring element are each supported on at least one of the first torque-limiting elements respectively, wherein each first torque-limiting element is connected to a housing in a torque-proof manner;

wherein the first torque-limiting elements are each operatively connected to at least one of the second torque-limiting elements respectively, each of the second torque-limiting elements being securely connected to the housing in an axial manner and rotatable with respect to the housing; and wherein each second torque-limiting element carries one of the blade receptacles or is configured to receive one of the blades.

15. The screwing tool according to claim 1, wherein the tool forms more than two blade receptacles and comprises more than one spring element, wherein two axes to which two screwing tools can be assigned intersect.

16. The screwing tool according to claim 1, wherein the first torque-limiting arrangement and the second torque-limiting arrangement are rotatable independent from each other.

* * * * *